(No Model.)   7 Sheets—Sheet 1.

C. NOËL.
MACHINE FOR CUTTING CORKS.

No. 605,297.   Patented June 7, 1898.

WITNESSES:
Geo. W. Jackel
William B. Roberts

INVENTOR
Charles Noël
BY
ATTORNEYS.

(No Model.) 7 Sheets—Sheet 3.

C. NOËL.
MACHINE FOR CUTTING CORKS.

No. 605,297. Patented June 7, 1898.

WITNESSES:
Geo. W. Jackel.
William B. Roberts.

INVENTOR
Charles Noël
BY
ATTORNEYS.

(No Model.)       C. NOËL.       7 Sheets—Sheet 6.
MACHINE FOR CUTTING CORKS.

No. 605,297.       Patented June 7, 1898.

WITNESSES:
Geo. W. Jackel
William B. Roberts

INVENTOR
Charles Noël
BY
ATTORNEYS.

(No Model.) 7 Sheets—Sheet 7.

C. NOËL.
MACHINE FOR CUTTING CORKS.

No. 605,297. Patented June 7, 1898.

WITNESSES:
Geo. R. Jackel.
William B. Roberts.

INVENTOR
Charles Noël
BY
ATTORNEYS.

UNITED STATES PATENT OFFICE.

CHARLES NOËL, OF PARIS, FRANCE, ASSIGNOR TO LA SOCIÉTÉ INDUSTRIELLE DU LIEGE ET DE LA BOUCHONNERIE PARISIENNE, OF SAME PLACE.

MACHINE FOR CUTTING CORKS.

SPECIFICATION forming part of Letters Patent No. 605,297, dated June 7, 1898.

Application filed March 13, 1897. Serial No. 627,347. (No model.) Patented in France November 12, 1895, No. 251,648.

*To all whom it may concern:*

Be it known that I, CHARLES NOËL, a citizen of the Republic of France, residing at Paris, France, have invented certain new and useful Improvements in Machines for Cutting Corks, (for which Letters Patent were granted to me in France, No. 251,648, dated November 12, 1895,) of which the following is a specification.

This invention has reference to an improved machine for cutting cylindrical or conical corks from rectangular cork blocks in a quick, accurate, and automatic manner; and the invention consists of the cork-cutting machine hereinafter described, and finally pointed out in the claims.

In the accompanying drawings.

Similar letters and figures of reference indicate corresponding parts.

The different operations which are performed by my improved cork-cutting machine are as follows: The cork wood is primarily cut into slabs and then into rectangular blocks, which are successively acted upon by the machine in an automatic manner. Each of the blocks is first taken hold of by two grippers mounted on a circular platform, which makes for every full rotation four stops at uniform intervals. At the end of the first quarter-rotation, after the first stop, the rectangular block is diminished in size by an endless cutting-blade and receives a circular cross-section. At the end of the second quarter-rotation, after the second stop, the block is again cut by a second endless blade to the proper shape and size and assumes the final form in which it is desired. At the end of the third quarter-rotation, after the third stop, the cork is taken hold of by a clamp and disengaged from the grippers, which continue their movements of rotation and take up at the fourth stop a new rectangular cork block. The cork which has been taken hold of by the clamp is subjected to the action of two circular parallel knives, which trim the ends of the cork to the required length, after which it is ejected from the machine.

Having thus described the general operations produced by my improved machine, the different parts which compose the same will now be described in successive order.

Figure 5:
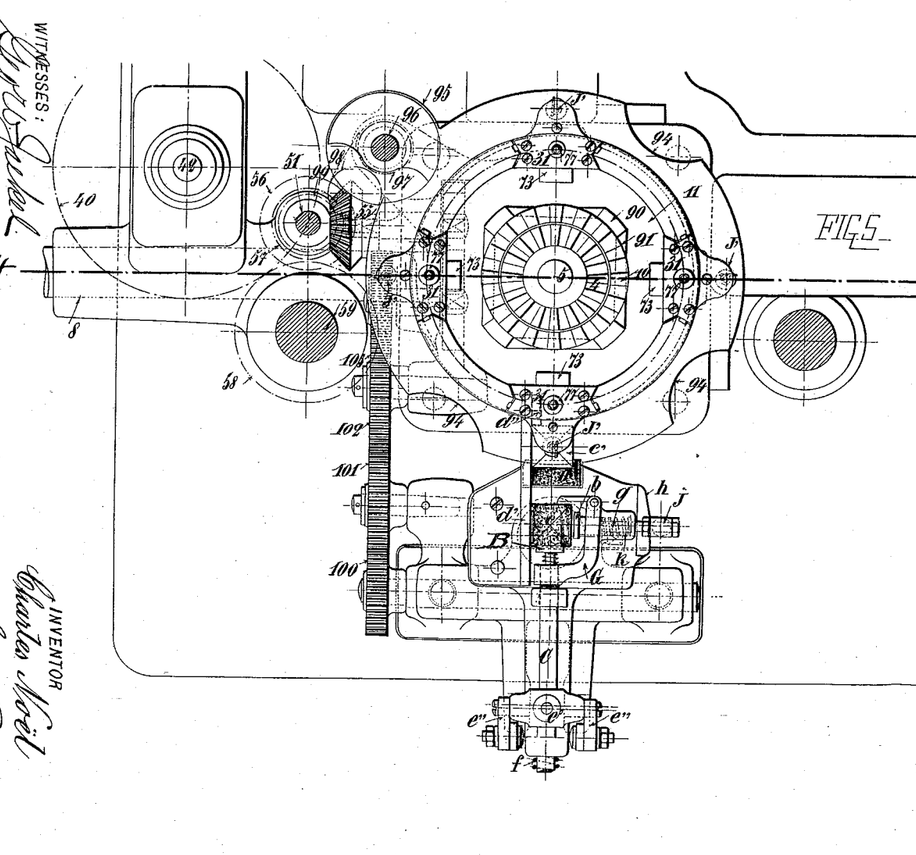
Fig. 5 is a plan view of Fig. 4, also drawn on a larger scale.
Figure 6:
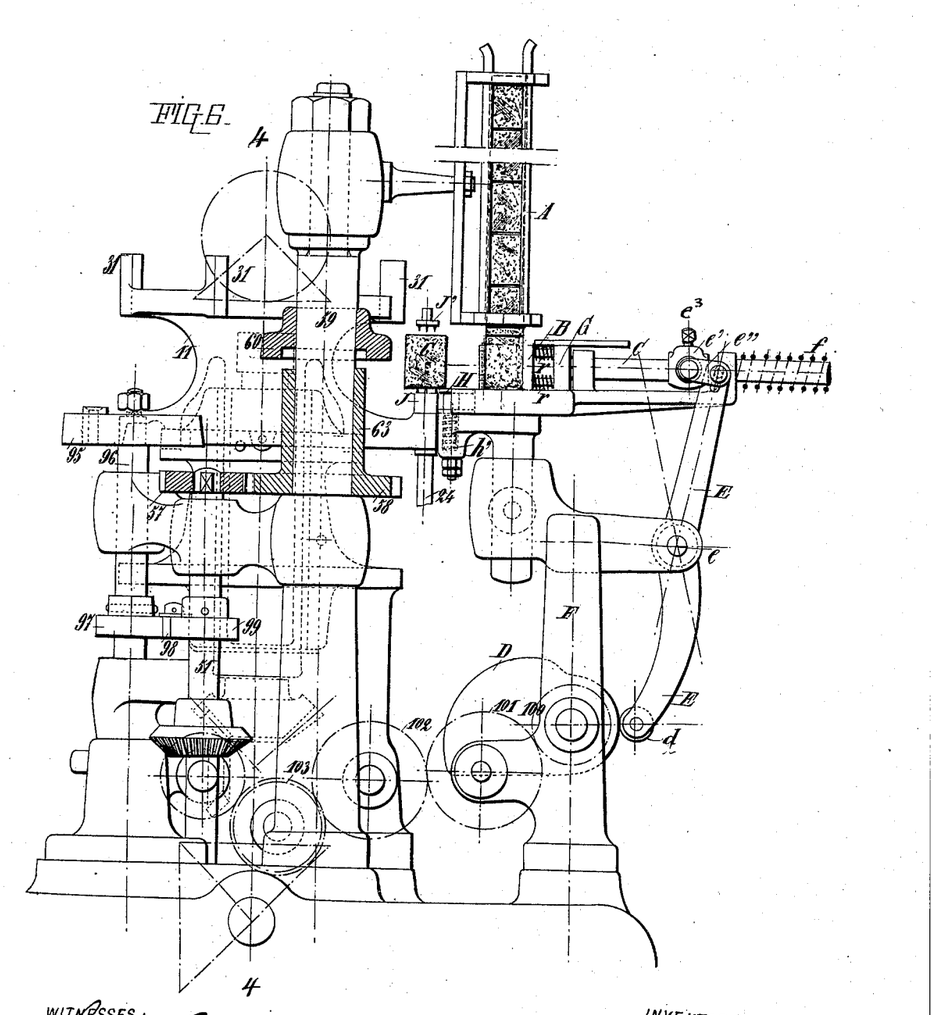
Fig. 6 is a side elevation of Fig. 5, partly in section, also drawn on a larger scale.

As shown in Figs. 5 and 6, the rectangular blocks of cork are introduced into a guide-frame A and are conducted successively by the same into the position shown at $c$, so as to be taken up by a carrier mechanism. In front of the cork block $c$ is arranged a plate B, which is applied to the end of a spindle C. This spindle receives its movement from a cam D, which acts upon an antifriction-roller $d$ at the lower end of a lever E, that is fulcrumed at $e$ to a bracket of an upright standard F of the machine. The upper end of the lever E is connected by two pivot-links $e^2$ to a cross-head $e'$, that is rigidly attached to the spindle C by means of a set-screw $e^3$. At every rotation of the cam D, which receives its motion from the gear-wheels 100, 101, 102, and 103, a cork block is pushed by the plate B into the position $c'$, Figs. 5 and 6. The plate B is then returned immediately into its former position by a helical spring $f$, that is applied to the outer end of the spindle C, as shown in Fig. 6.

As all the cork blocks which are fed to the carrier mechanism are not always of exactly the same dimensions, there are arranged between the plate B and hub of the yoke G small springs $r$, which impart to the plate B a sufficient play for compensating for the different sizes of the cork blocks. The hub of the yoke G is fixed to the spindle C, said yoke having an offset portion in which is mounted a shorter spindle $g$, which carries a plate $b$, that is arranged to bear on the side of the cork block, so as to press the latter before it is moved forward against the stationary guide-plate $d'$, arranged at the opposite side of the block. The spindle $g$ carries at its outer end an antifriction-roller $j$, which moves during the forward movement of the spindle C along an inclined guide $h$. The spindle $g$ is acted upon by a helical spring $k$, its plate $b$ serving for impressing the cork block against the guide-plate $d'$ until it has been moved into the position $c'$ against a stop $d^2$, that is screwed to the fixed guide-plate $d'$, which is shown in Fig. 5, but removed in Fig. 6.

A spring-cushioned platform H permits the cork block in its forward movement to be placed on a level with the points of a lower gripper J. As soon as a similar gripper $J'$, supported vertically above the lower gripper, is lowered on the upper end of the cork block the platform H is lowered evenly against the tension of its cushioning-springs $h'$, so as to permit the cork block to be pressed onto the points of the lower gripper J without any shifting in the position of the block.

Figure 1:
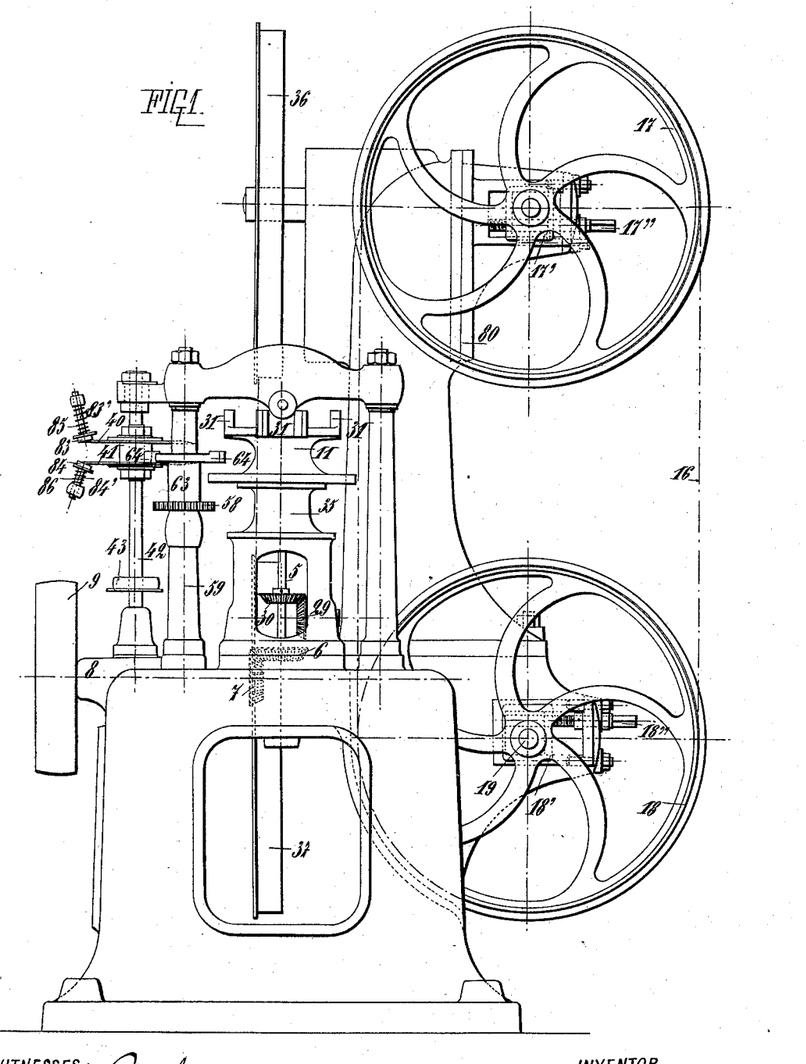
Figure 1 represents a front elevation.
Figure 3:
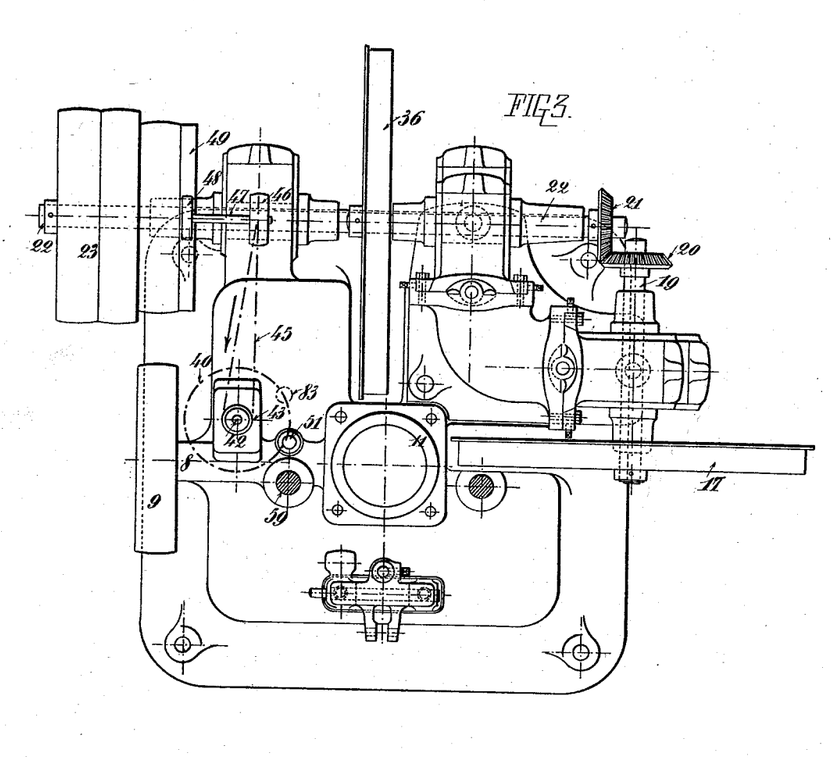
Fig. 3 is a plan view of my improved machine for cutting corks, partly in horizontal section.
Figure 4:
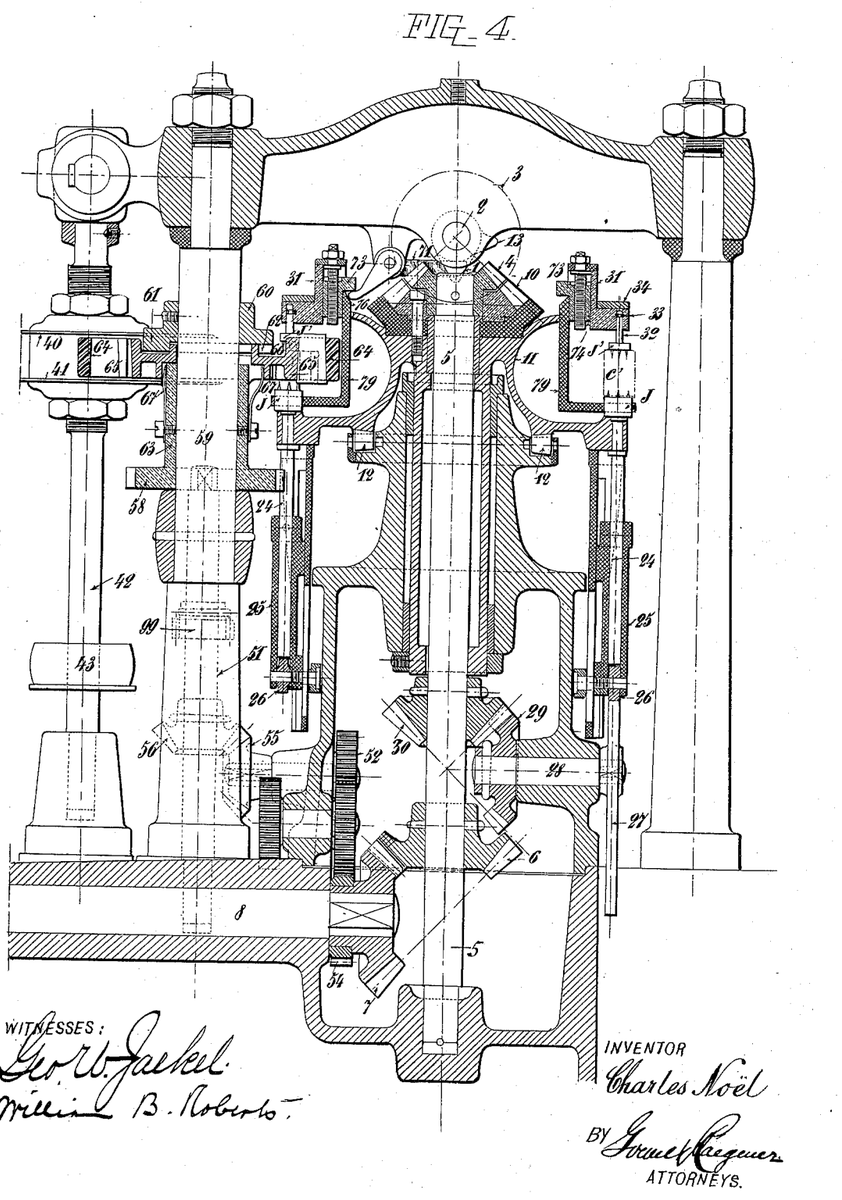
Fig. 4 is a vertical transverse section of the main parts of the machine on line 4 4, Fig. 5, drawn on a larger scale.
Figure 7:
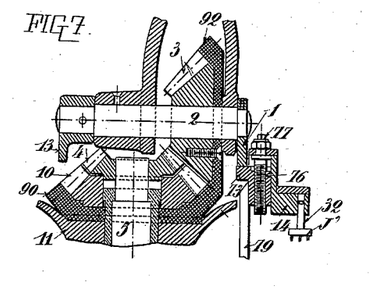
Fig. 7 is a detail vertical section showing the mechanism for imparting intermittent rotary motion to the cork-block-supporting platform.

The downward movement is imparted to the upper gripper $J'$ by a cam 1, Figs. 4 and 7, which is mounted on a horizontal shaft 2, that is acted upon by a gear-wheel 3, having a double series of teeth. This gearing 3 receives motion from a bevel-wheel 4, having an even number of teeth—for instance, twenty. The bevel-wheel 4 is applied to a vertical shaft 5, which is supported in step-and-neck bearings of the supporting-frame of the machine and actuated by the bevel-wheels 6 and 7, of which the latter is mounted on a horizontal shaft 8, that carries the power-transmitting pulley 9, as shown in Figs. 1 and 3. The vertical shaft 5 receives a continuous rotary motion by the bevel-wheels 6 and 7 and transmits a continuous rotary motion by bevel-wheel 4 to the bevel-wheel 3. This latter has, as before stated, a double set of teeth, one set intermeshing with the teeth of the smaller bevel-wheel 4, while the other set has only one-fourth of the number of teeth of the first set, consequently in this case five. These five teeth, which are arranged closely and consecutively to each other, impart to a bevel-wheel 10, which has a full set of teeth, an intermittent movement, so that consequently for every time the bevel gear-wheel 4 makes an entire rotation on its axis the gear-wheel 10 is moved only for one-fourth of a rotation. The bevel-wheel 10 is mounted on a platform 11, which carries four pairs of grippers J $J'$ and takes along the cork blocks fed consecutively to the same. This platform is mounted loosely on the shaft 5 and supported at its lower part on a number of antifriction-rollers 12, that turn in a circular raceway, as shown in Fig. 4. A cam 13 (shown in Figs. 4 and 7 and mounted at the opposite end of the shaft 2) produces the raising of the slide 31, which carries the upper gripper $J'$, so as to withdraw it from the cork after it is cut into its proper shape, as will be described hereinafter.

By the turning of the shaft 5 and the intermediate bevel-wheels 4 3 10 the platform 11 is moved intermittently, making one-quarter rotation for every full rotation of the shaft 5. The cork block is thereby moved with the platform 11 into its second position and is acted upon by an endless cutting-blade 16, which reduces the same to cylindrical shape. This blade is tightly stretched on two wheels 17 and 18, of which the lower one 18 is mounted on a shaft 19, that is provided with a bevel-pinion 20, which meshes with a similar pinion 21 on the shaft 22, that receives rotary motion from the power-driven pulleys 23. The motion-transmitting mechanism described imparts rotary motion to the wheels 17 and 18 and thereby a continuous movement to the endless cutting-blade 16, that is stretched around the same.

For the purpose of permitting a slight inclination of the endless cutting-blade 16 toward the perpendicular the shafts of the wheels 17 and 18 are mounted in bearings $17'$ and $18'$, which can be readily shifted in a horizontal direction by means of set-screws $17^2$ and $18^2$. This inclination, which may be thus imparted to the endless blade, permits the cutting of conical stoppers. The upper bearing $17'$ is furthermore guided in vertical ways 80, so as to permit the vertical adjustment of the same and impart thereby the required degree of tension to the endless cutting-blade 16.

Figure 10:
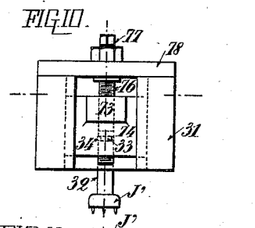
Figs. 10, 11, and 12 are details showing the supporting device for the upper block-holding gripper.
Figure 12:
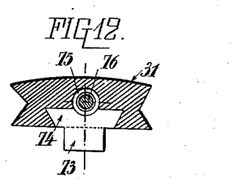

For the purpose of reducing the cork block $c'$ while it is subjected to the cutting action of the endless blade 16 it is necessary to impart to the cork block simultaneously a rotary movement. For this purpose the gripper J, Fig. 4, is mounted on the upper end of a screw-spindle 24, which has a very slow pitch and which is guided in an elongated screw-nut 25, that carries at its lower part an antifriction-roller 26, which is actuated by a cam 27. This cam is keyed to a horizontal shaft 28, which receives rotary motion from the vertical shaft 5 by the intermittent bevel-wheels 30 and 29, the former being keyed to shaft 5. When the cam 27 raises the antifriction-roller 26, the screw-nut 25 is lifted and imparts a rotary movement to the screw-spindle 24 and gripper J, the spindle of which turns in a sleeve of the platform 11. The cork block $c'$ turns likewise on its axis, as the upper gripper $J'$ follows the rotary movement of the gripper, as its spindle 32 is loosely supported in the supporting slide-piece 31. The spindle 32 of the upper gripper $J'$ is, as shown in detail in Figs. 10 and 12, provided for this purpose at a suitable point with a circular groove 33, which is engaged by a key 34, driven through the sleeve of the slide-piece 31, so as to permit the turning of the upper gripper $J'$ on its axis, as well as the raising of the same with its slide-piece 31.

After the first operation—namely, the reducing of the size of the cork block—has been accomplished the platform is moved again through a quarter-rotation, so that the reduced cork block is subjected to the action of a second endless cutting-blade 35, by which the cork block receives the final form which is intended to be given thereto.

Figure 2:
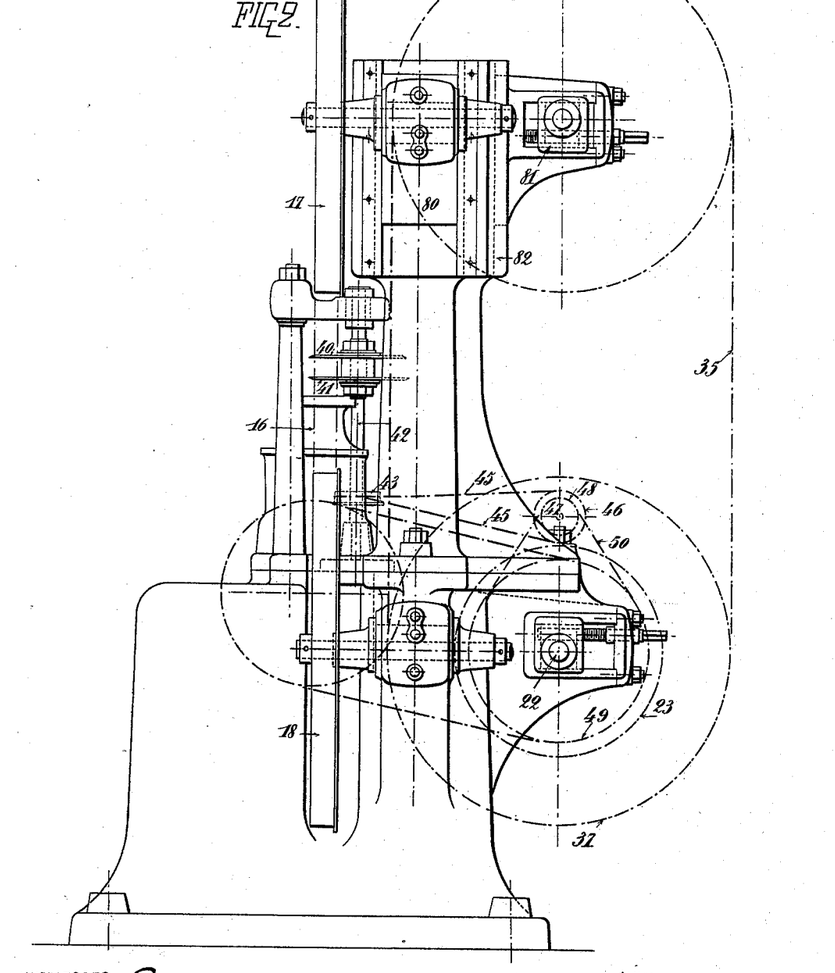
Fig. 2, a side elevation.
Figure 13:
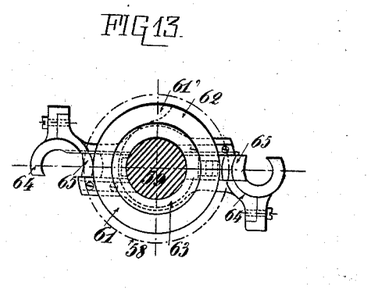
Fig. 13 is a horizontal section of the parts by which the movement of the cork holding and delivering clamps is produced.

The second endless cutting-blade 35 is shown in Figs. 2 and 3 and is mounted at an angle of ninety degrees to the plane of the blade 16 and stretched on wheels 36 and 37, the shafts of which are, like the wheels 17 and 18 of the blade 16, supported in bearings that are capable of adjustment in a horizontal direction. The bearing of the wheel 36 can likewise be adjusted in vertical direction in guideways 82, so as to permit the proper tension to be imparted to the endless cutting-blade 35 at the moment when the endless blade 35 acts on the cork block, which latter is simultaneously turned on its axis by a screw-nut 25, screw-spindle 24, roller 26, and a cam the function of which corresponds to the cam 27, acting on the antifriction-roller 26. This cam is arranged at an angle of ninety degrees to the cam 27, but is not shown in the drawings. The cork being thus finished on its surface, it is necessary to cut the same to the required length. For this purpose two parallel horizontal knives 40 and 41, as shown in Figs. 3, 4, and 5, are arranged, which can be set closer to or farther away from each other at will, according to the length which is to be given to the cork. These trimming-knives are mounted on a vertical shaft 42, which receives continuous rotary motion in the following manner: On the shaft 42 is mounted a pulley 43, on which a cross-belt 45 is placed that laps also around pulley 46 on an auxiliary shaft 47. This shaft carries at its opposite end a friction-pulley 48, which receives rotary motion by belt 50 from the pulley 49, that is mounted on the driving-shaft 22. At the moment when the horizontal knives 40 and 41 act on the cork c' the latter is released from the grippers J and J', but is still held in position. This is accomplished by an intermediate vertical shaft 51, (shown in Figs. 4 and 5,) to which rotary motion is imparted by the gear-wheels 52 and 54 from the shaft 8, on which the gear-wheel 54 is mounted, and by the bevel-wheels 55 and 56, the rotary motion of the shaft 51 being transmitted by a gear-wheel 57, mounted on the shaft 51, to a gear-wheel 58, made integral with a sleeve 63, that is mounted on a fixed vertical pillar 59, as shown in Fig. 4. This pillar 59 carries at its upper part a piece 60, (shown in Fig. 4 and in detail in Fig. 13,) which has a cam portion 61 and a cut-out portion 62. The sleeve 63 is located below said cam portion and carries two diametrical extensions 64, that are arranged at an angle of one hundred and eighty degrees to each other. These extensions 64 terminate in cylindrical holders, as shown in plan view in Fig. 13. Between the sleeve 63 and the piece 60 are arranged two clamps 65, working in the extensions 64, which are provided with a horizontal groove 66, Fig. 4, the width of which is equal to that of the cam portion 61 of the piece 60. The cam portion 61 terminates at one side of the piece 60, leaving an opening through that side, and when the clamp 65 arrives at this point, there being no cam portion to restrain it, the said clamp is acted upon by the spring 67 and forced outwardly toward the cylindrical holder 64, so as to hold the cork firmly in the holder. The cork being in this position is held and taken along by the rotary movement of the holder and guide. When, however, the cam portion 61 of the piece 60 is located in the groove 66 of the clamp 65, the latter is held in position, and the spring 67 cannot exert any action on the same, so that the clamp 65 does not press the cork any more against the cylindrical holder 64, before mentioned, and permits the dropping of the cork from the holder.

The different instrumentalities thus described are so arranged that one of the clamps takes hold of a cork, which is then released from the grippers J and J' and pressed against the cylindrical holder of one of the extensions 64 when the cork has passed through the third quarter of the rotation of the platform 11. By the movement of the clamps and the rotation of the holders the cork, supported in one of the holders, is carried along by the rotary movement of the same and then subjected to the action of the rotary knives 40 and 41, which turn with their shaft. As soon as this rotary action is terminated and the ends of the cork are trimmed off by the knives the groove 66 of the clamp 65, before referred to, comes in contact with a point 61' of the cam portion 61, so that gradually the cam portion engages the groove and moves the clamp toward its axis, so that the latter releases the cork, which then drops down from the machine. At this moment, when the cork is thus finished and left to itself, the other holder receives another cork from the next pair of grippers J and J'.

Figure 11:
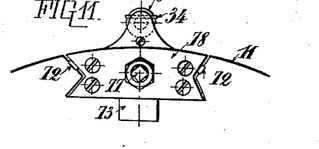

It follows therefore, as is easily understood, that when the clamps and holders make a full rotation the platform 11 makes one-half a rotation. At the moment when the holder begins to take hold of the cork held between the grippers J and J' it is absolutely necessary that the grippers are released from the cork, so that the latter can be engaged by the holder and clamp. The receding motion of the grippers J and J' is obtained by lifting the upper gripper J'. For accomplishing this motion the cam 13, which has before been referred to, is employed. This cam is shown in Figs. 4 and 7, is mounted on shaft 2, and acts upon the end of a lever 71, which is fulcrumed and supported in the top frame of the machine, so as to produce the movement necessary for the action of the slide-piece 31, Fig. 10. As shown in Figs. 10, 11, and 12, the slide-piece 31, which is grooved in its ends, is guided in the upper part of the platform 11. Two flat springs 72 serve to exert friction on the ways in which the slide-piece 31 is guided, as shown in Fig. 11. The lever 71 engages a projection 73, which is carried by the block 74, that is guided in ways of the slide-piece 31. Block 74 is provided with a collar 75, which is adjusted by a screw 76. When this screw is turned by means of a wrench applied to its square head 77, the block 74 is raised or lowered. The plate 78, that is attached by screws to the slide-piece 31, prevents the screw 76 from being shifted in longitudinal direction and permits it to be turned only on its axis.

For the purpose of positively disengaging the lower gripper J from the cork after the same has been released from the upper gripper J' a hanger 79, which surrounds the lower gripper and which is attached to the slide-piece 31, prevents it from acting on the bottom of the cork and restrains the lower gripper from following the slight ascending movement of the corks. The cork being thus disengaged by the lower gripper and at the same time taken hold of by the clamp and holder 64 and 65 is, like the slide-piece 31, compelled to follow slowly the slide-piece 31, which is slightly raised, and as the cork cannot follow this motion, being held by the clamp and holder 64 and 65, it is likewise disengaged from the upper gripper J'. It can then, as it is thus released from both grippers, readily follow the rotary movement of the clamp and holder.

The horizontal cutting-knives 40 and 41 are sharpened in a continuous manner during their rotation. For this purpose they are acted upon at their circumference by two small inclined grindstones 83 and 84, which are mounted on the small shafts 83' and 84' and pressed by means of springs 85 and 86 constantly on the edge of the cutting-knives.

Figure 8:
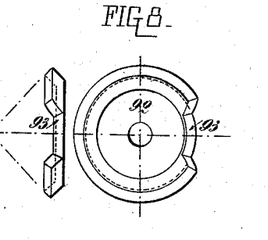
Figs. 8 and 9 are detail views showing some of the parts of Fig. 7 in detail top and side view.
Figure 9:
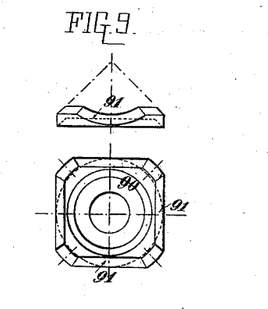

As we have seen before while describing the different parts of the platform 11, on which the corks arrive for being operated upon, said platform has to be stopped at each quarter-rotation, as otherwise, owing to the momentum imparted thereto, the platform would have a tendency to continue its rotary motion like a fly-wheel by the momentum imparted thereto. For remedying this objection a plate 90 is arranged below the gear-wheel 10, as shown in Fig. 7, and is provided with recesses in its edge which are equal in number to the stops of the platform, so as to make one stop at each rotation of the gear-wheel 10. On the gear-wheel 3, Figs. 4, 7, and 8, is likewise arranged a plate 92, which has only one single recess 93. By means of this construction the gear-wheel 10 cannot turn except when the recess 93 approaches the adjacent edges of plate 90, and it is exactly at this moment that the teeth of the gear-wheel 3 engage the teeth of the gear-wheel 10. The contact of the non-recessed circumference of the plate 92 with one of the recessed portions of plate 90 produces thereby a stop and prevents a further movement of rotation of the platform 11.

For securing in a still more complete manner the reliable stops of the platform 11 the latter is further provided in its circumference with four recesses 94, as shown in Fig. 5. Each of these recesses is placed in its turn by the rotation of the platform in contact with a cam 95, that is mounted on a vertical shaft 96, which receives rotary motion by means of the transmitting gear-wheels 97, 98, and 99. The gear-wheel 99, which transmits this motion, is mounted on the shaft 51, which receives its rotary motion as before described. When one of the recesses 94 is placed in line with the recessed portion of the cam 95, the platform can turn; but otherwise it is rigidly held in position. It has to be noted in this connection that the action of the plates 90 and 92 and the action of the recesses 94 of the platform 11 on the cam 95 have to take place simultaneously.

Having thus described my invention, I claim as new and desire to secure by Letters Patent—

1. In a machine for cutting corks, the combination, with a carrier and guide mechanism for the cork blocks, of an intermittently-rotating platform provided with four pairs of equidistant grippers, two endless cutting-blades arranged at right angles to each other and adapted to act successively on said blocks, horizontal rotary trimming-knives acting on the block after the third stop, and clamping-holders for delivering the cork from the grippers and supporting it for the action of the trimming-knives, substantially as set forth.

2. In a machine for cutting corks, the combination, with a guide-frame for feeding the cork blocks, of a horizontal guideway for receiving the cork blocks, a horizontal reciprocating pusher-plate for feeding the cork blocks forward to the grippers, a spring-pressed side plate connected with and reciprocating with said pusher-plate, and means for intermittently actuating said plates, substantially as set forth.

3. In a machine for cutting corks, the combination, with an intermittently-rotating platform provided with a series of upper and lower grippers arranged in pairs, each of the lower grippers having a screw-spindle provided with thread of slow pitch, a vertically-guided screw-sleeve surrounding and engaging said threaded spindle, and an intermittently-rotating cam actuating said sleeve so as to impart rotary motion on its axis to the lower gripper and by the cork block to the upper spindle, substantially as set forth.

4. In a machine for cutting corks, the combination, with an intermittently-rotating platform, said rotating platform having four pairs of grippers for holding the cork blocks, means for releasing the cork blocks from the grippers, clamping-holders for transferring the corks from the grippers, a pair of horizontal parallel trimming-knives for cutting off the ends of the corks delivered to said holders, and means for releasing the corks from the holders after they are trimmed, substantially as set forth.

5. In a machine for cutting corks, the combination, with an intermittently-rotating platform having pairs of grippers, means for intermittently arresting and locking said platform, a pair of rotary clamping-holders moving into the path of the cork, means for actuating the grippers so as to release the corks to said holders, a pair of horizontal parallel trimming-knives for cutting off the ends of the corks, and means for releasing the corks after the same have been trimmed at the ends, substantially as set forth.

6. In a machine for cutting corks, the combination, with a supporting-frame, a power-driven shaft stepped in said frame, an intermittently-rotating platform sleeved on said power-shaft and supported by said supporting-frame, means for locking the platform after each partial rotation, a large gear carried by said platform, a small gear carried by the said power-shaft and nested in said large gear, a combined full and mutilated gear the full teeth meshing with the small gear and the mutilated teeth meshing with the large gear whereby an intermittent rotation is imparted to said platform, substantially as set forth.

7. In a machine for cutting corks, the combination with a pillar, of a gear-wheel provided with a sleeve loosely mounted on said pillar and provided with springs two extensions carried by said sleeve and terminating in holders, grooved clamps working in said extensions, and a cam-faced piece fixed on said pillar above the said sleeve and adapted to operate said clamps in one direction, said springs being adapted to operate the clamps in the reverse direction, substantially as set forth.

In testimony whereof I have signed this specification in the presence of two subscribing witnesses.

CHARLES NOËL.

Witnesses:
 EDWARD P. MACLEAN,
 ANTOINE ROUSSANNES.